US011188188B2

(12) United States Patent
Bradley et al.

(10) Patent No.: US 11,188,188 B2
(45) Date of Patent: *Nov. 30, 2021

(54) SYSTEM AND METHOD OF PROVIDING AUTOMATED CUSTOMER SERVICE WITH AUGMENTED REALITY AND SOCIAL MEDIA INTEGRATION

(71) Applicant: AT&T Intellectual Property I, L.P., Atlanta, GA (US)

(72) Inventors: Nigel Bradley, Canton, GA (US); Bhumit Patel, Smyrna, GA (US); Eric Zavesky, Austin, TX (US); James Pratt, Round Rock, TX (US); Timothy Innes, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,929

(22) Filed: Sep. 24, 2020

(65) Prior Publication Data

US 2021/0004139 A1    Jan. 7, 2021

Related U.S. Application Data

(63) Continuation of application No. 16/675,435, filed on Nov. 6, 2019, now Pat. No. 10,817,133, which is a
(Continued)

(51) Int. Cl.
*G06F 3/048* (2013.01)
*G06F 3/0481* (2013.01)
(Continued)

(52) U.S. Cl.
CPC .......... *G06F 3/04815* (2013.01); *G06F 3/011* (2013.01); *G06F 3/017* (2013.01);
(Continued)

(58) Field of Classification Search
CPC ....... G06T 19/006; G06T 19/20; G06T 17/00; G06T 2219/024; G06T 7/70; G06T 11/00;
(Continued)

(56) References Cited

U.S. PATENT DOCUMENTS 6,577,249 B1    6/2003  Akatsuka et al.
9,704,297 B2    7/2017  Kaino et al.
(Continued)

OTHER PUBLICATIONS

Grubert, et al., "Towards Pervasive Augmented Reality: Context-Awareness in Augmented Reality", IEEE Transactions on Visualization and Computer Graphics, vol. 23. No 6, Jun. 2017, 19 pages.
(Continued)

*Primary Examiner* — Linh K Pham
(74) *Attorney, Agent, or Firm* — Guntin & Gust, PLC; Robert Gingher

(57) ABSTRACT

Aspects of the subject disclosure may include, for example, a device, comprising: a display; a sensor for detecting three dimensional objects; a processing system including a processor coupled to the display and sensor; and a memory that stores executable instructions that, when executed by the processing system, facilitate performance of operations, the operations comprising: identifying a three dimensional object proximal to a user of the device; tracking and storing a position of the three dimensional object; creating an augmented reality (AR) presentation for the user, wherein
(Continued)

the AR presentation includes an image of the three dimensional object and an enhancement of the three dimensional object; and displaying the AR presentation to the user. Other embodiments are disclosed.

20 Claims, 6 Drawing Sheets

Related U.S. Application Data continuation of application No. 15/695,443, filed on Sep. 5, 2017, now Pat. No. 10,509,534.

(51) Int. Cl.

| | |
|---|---|
| *G06T 19/00* | (2011.01) |
| *G06T 11/60* | (2006.01) |
| *G06F 3/16* | (2006.01) |
| *G06F 3/01* | (2006.01) |
| *G06Q 10/00* | (2012.01) |
| *G06Q 30/00* | (2012.01) |
| *G06Q 50/00* | (2012.01) |

(52) U.S. Cl.
CPC .............. *G06F 3/048* (2013.01); *G06F 3/167* (2013.01); *G06T 11/60* (2013.01); *G06T 19/006* (2013.01); *G06Q 10/20* (2013.01); *G06Q 30/016* (2013.01); *G06Q 50/01* (2013.01)

(58) Field of Classification Search
CPC ..... G06T 19/003; G06T 11/001; G06T 13/20; G06F 3/011; G06F 3/012; G06F 3/0346; G06F 3/1454; G06F 3/0482; G06F 3/04842; G06F 16/188; G06F 2212/152; G06F 3/0338; G06F 3/016; G06F 2203/04109

See application file for complete search history.

(56) References Cited

U.S. PATENT DOCUMENTS

| | | | |
|---|---|---|---|
| 2011/0115816 A1 | 5/2011 | Brackney | |
| 2013/0036353 A1* | 2/2013 | Zavesky | G06F 16/4393 715/716 |
| 2014/0225919 A1 | 8/2014 | Kaino et al. | |
| 2015/0235267 A1* | 8/2015 | Steube | H04N 21/4223 705/14.58 |
| 2015/0352437 A1* | 12/2015 | Koseki | G06F 3/011 463/31 |
| 2016/0133057 A1 | 5/2016 | Kaino et al. | |
| 2017/0061696 A1 | 3/2017 | Li et al. | |
| 2017/0313248 A1 | 11/2017 | Kothari | |
| 2017/0359467 A1* | 12/2017 | Norris | H04S 7/304 |
| 2018/0040162 A1* | 2/2018 | Donnelly | G05D 1/0246 |
| 2018/0040163 A1* | 2/2018 | Donnelly | G06F 3/017 |
| 2018/0054611 A1 | 2/2018 | Shin | |
| 2018/0120944 A1* | 5/2018 | Wang | G06F 3/013 |
| 2018/0125716 A1 | 5/2018 | Cho et al. | |
| 2018/0143756 A1* | 5/2018 | Mildrew | G06T 19/003 |
| 2018/0190022 A1* | 7/2018 | Zamir | G06T 19/006 |
| 2018/0220048 A1 | 8/2018 | Tamir et al. | |
| 2018/0232056 A1 | 8/2018 | Nigam et al. | |
| 2019/0073110 A1* | 3/2019 | Bradley | G06T 11/60 |
| 2019/0073533 A1 | 3/2019 | Chen et al. | |

OTHER PUBLICATIONS

Neumann, Ulrich et al., "Cognitive, Performance, and Systems Issues for Augmented Reality Applications in Manufacturing and Maintenance", IEEE, 1998, 8 pages.

* cited by examiner

100

SYSTEM AND METHOD OF PROVIDING AUTOMATED CUSTOMER SERVICE WITH AUGMENTED REALITY AND SOCIAL MEDIA INTEGRATION

CROSS-REFERENCE TO RELATED APPLICATIONS

This application is a continuation of U.S. patent application Ser. No. 16/675,435 filed Nov. 6, 2019, which is a continuation of U.S. patent application Ser. No. 15/695,443 filed on Sep. 5, 2017 (now U.S. Pat. No. 10,509,534), the contents of which are hereby incorporated by reference into this application in their entirety.

FIELD OF THE DISCLOSURE

The subject disclosure relates to a system and method for providing automated customer service with augmented reality and social media integration.

BACKGROUND

Virtual reality systems provide immersive user experiences into artificial, computer-generated environments. Custom applications have been developed to accurately analyze the behaviors of consumers presented with hypothetical products presented in such computer-generated environments. Some systems modify the presentation of images of objects created in a virtual reality based on environmental inputs. Input devices may include cameras and/or wearable locators that detect eye position, orientation, and movements of a user. The systems may provide iconography in the form of virtual highlighting (e.g., semitransparent amber overlay) drawing the attention of the user to particular features shown in a 3D virtual product representation. Businesses offering complex services may require technicians to install and repair equipment at customer premises, which can be very costly.

BRIEF DESCRIPTION OF THE DRAWINGS

Reference will now be made to the accompanying drawings, which are not necessarily drawn to scale, and wherein.

DETAILED DESCRIPTION

Figure 1:
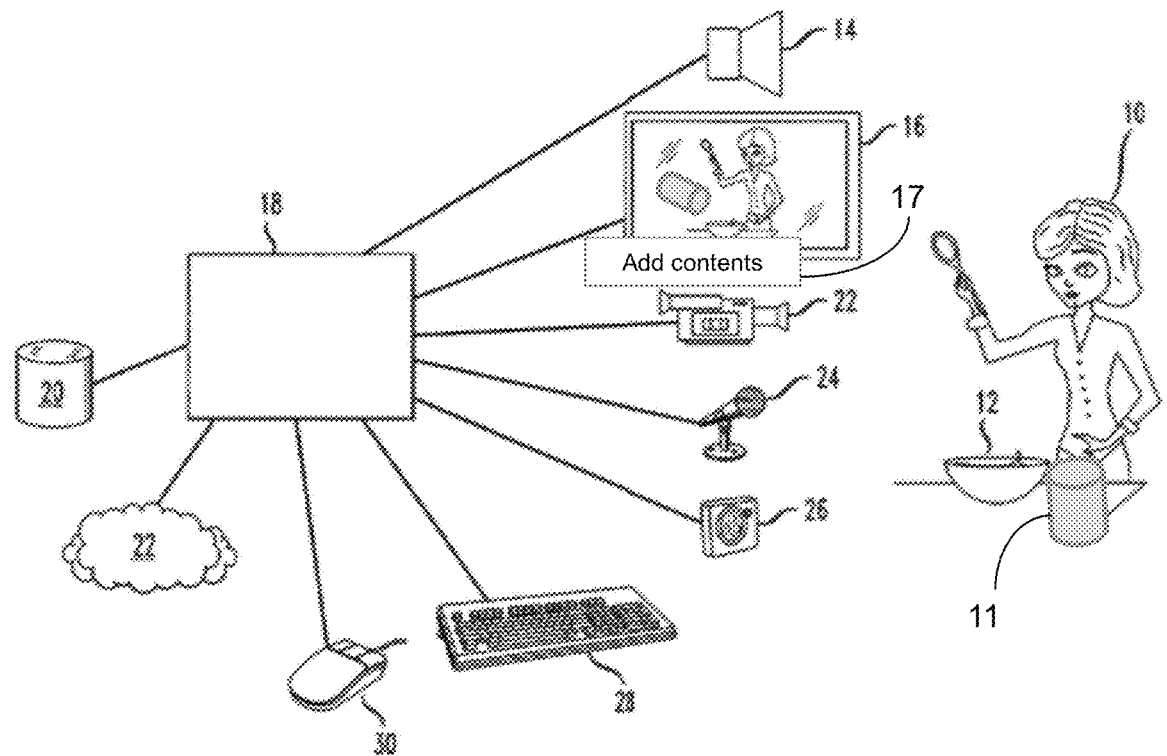
FIG. 1 depicts a schematic diagram providing illustrative embodiment of a system for providing an augmented reality presentation.

The subject disclosure describes, among other things, illustrative embodiments for a content management system (CMS) that uses machine learning to determine the steps of an augmented reality (AR) customer service/IT solution process (e.g., a 3D AR demonstration of how to trouble shoot an AT&T Uverse remote control, or a 3D AR step by step demonstration of how to reboot a set top box). AR self-help experiences created both by social media platforms as well as business operators provide a means for consumers to install and fix their own equipment that provides them with services. The CMS absorbs user made AR content of users solving a problem, or giving a tutorial, along with metadata about the video. The system analyzes the audio and video along with metadata to create a more intelligent and integrated CMS platform. Users are provided with on demand access to AR interactive recordings that walk them problem solutions, and integrated help if requested. Other embodiments are described in the subject disclosure.

One or more aspects of the subject disclosure include a device, comprising: a display; a sensor for detecting three dimensional objects; a processing system including a processor coupled to the display and sensors; and a memory that stores executable instructions that, when executed by the processing system, facilitate performance of operations, the operations comprising: identifying a three dimensional object proximal to a user of the device; tracking and storing a position of the three dimensional object; creating an augmented reality (AR) presentation for the user, wherein the AR presentation includes an image of the three dimensional object and an enhancement of the three dimensional object; and displaying the AR presentation to the user.

One or more aspects of the subject disclosure include a machine-readable storage medium, comprising executable instructions that, when executed by a processing system including a processor, facilitate performance of operations, the operations comprising: identifying a three-dimensional (3D) object located near a user performing a target process; identifying the target process being performed by the user; retrieving an augmented reality (AR) presentation from a content management system based on recognition of the 3D object present and the target process being performed by the user; tracking a location of the 3D object using one or more of sensors as the user performs the target process; sensing user activity as the user performs the target process; determining a step in the target process being performed by the user based on the location of the 3D object and the user activity sensed; and enhancing a display of the AR presentation based on the step in the target process determined.

One or more aspects of the subject disclosure include a method, comprising: identifying, by a processing system including a processor, a target process being performed by a user; retrieving, by the processing system, an augmented reality (AR) presentation from a content management system based on recognition of the target process being performed by the user; sensing, by the processing system, user activity as the user performs the target process; determining, by the processing system, a step in the target process being performed by the user based on the user activity sensed; and enhancing, by the processing system, a display of the AR presentation based on the step in the target process determined.

FIG. 1 depicts a schematic diagram providing illustrative embodiment of a content management system (CMS) for providing an augmented reality presentation. As shown in FIG. 1, the system provides an augmented reality presentation that is displayed based on a user's activities observed using sensors while the augmented reality presentation is being displayed. User 10 is shown performing an activity involving objects 11, 12, which, in this example, is a can and a mixing bowl, respectively. User 10 observes augmented reality information via display 16 and speaker 14, each of which is connected to an augmented reality processing unit 18.

Augmented reality processing unit 18 is configured to present information retrieved from database 20 which stores various kinds of information such as augmented reality presentations. Augmented reality information stored in database 20 may include visual enhancements to three dimensional objects and object locations detected within the user environment. Augmented reality information can be presented to user 10 via display 16 and speaker 14. In an embodiment, the image disclosed on display 16 is enhanced with the augmented reality information, for example, with text indicating an action that user 10 should take in a process, or a manipulation of physical objects detected and tracked and reoriented or moved. An augmented reality presentation, in one embodiment, is presented synchronized with user activity observed via sensors such as camera 22, microphone 24, motion sensor 26, keyboard 28, and mouse 30, or other input devices such as a tablet, touch screen, or VR glove (not illustrated), each of which is connected to augmented reality processing unit 18. In an alternative embodiment, the sensors, display and speaker may be integrated in a three-dimensional virtual reality headset (not illustrated). The system provides a reflection of the current scene, enhanced with visual augmented reality rendering of a next step in a process, tracks the user 10's movements, and corrects the user's mistakes in real time, and gives the user positive feedback for successful completion of the next step in the process.

Camera 22 is used to capture images of user 10 as well as objects, such as objects 11, 12, and the environment in which the user is currently located. In an embodiment, virtual-reality (VR) recognizable tags can help speed the process of object recognition, such as object 11 and/or 12. VR tags may include, but are not limited to, markers, color-coded indicators, radio frequency identification (RFID) tags or bar codes. Augmented reality processing unit 18 uses images captured by camera 22 and other sensors to derive a spatial understanding of where user 10 and other objects are located in the environment of user 10. Microphone 24 is used to receive ambient sounds including the voice of user 10 and may be used for voice-controlled functions based on user input, such as speaking keywords. Keyboard 28 and mouse 30 can be used to receive input from user 10 while motion sensor 26 can be used to acquire motion and distance information. Motion sensor 26 can, for example, detect one or more user gestures or movements as well as the location of objects as described further below. Although not shown in FIG. 1, other sensors may be used as well, for example range sensors, location sensors, environmental sensors, infrared, temperature, wind speed, radio frequency and other transducers for converting various parameters into signals suitable for input to augmented reality processing unit 18. The sensors can be used in various combinations depending on factors such as user preferences, cost constraints, etc.

Augmented reality processing unit 18 is in communication with database 20 and can retrieve augmented reality information for presentation to a user as described further below. Augmented reality processing unit 18 is also in communication with network 22 through which augmented reality processing unit 18 can acquire augmented reality information from various sources such as individual users, content providers, businesses, as well as additional content available from the Internet. Augmented reality processing unit 18 historically tracks object locations and actions taken by user 10 during performance of a process. Network 22 may also provide additional intelligence to synchronize object locations, highlight object, and to provide visual or audio navigation cues to the user 10. For example, display 16 indicates that object 11 should be moved to add contents to mixing bowl 12. An additional label 17 provides text expressly indicating that user 10 should add the contents to the mixing bowl.

Figure 2:
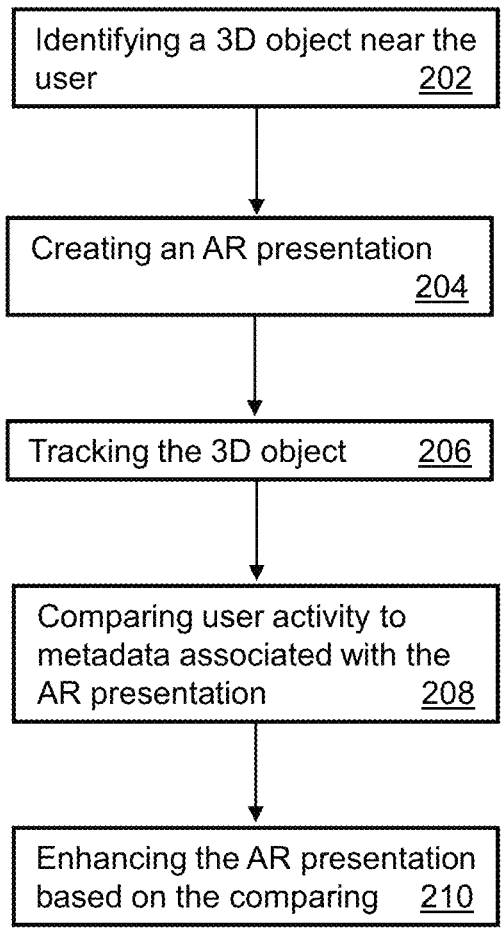
FIG. 2 depicts an illustrative embodiment of a method used in portions of the system described in FIG. 1.

FIG. 2 depicts an illustrative embodiment of a method according to one embodiment in which an AR presentation is provided to a user and adjusted based on user activity. At step 202, AR processing unit captures the environment in which a user will be performing a target process with certain equipment. AR processing unit 18 identifies certain equipment used in the target process as a three-dimensional (3D) object located near the user, as the user performs the target process.

In an embodiment, the process of identifying and mapping equipment may be automated by tagging the equipment. Tagging equipment with VR recognizable tags enables users installing, fixing, or simply wishing to map the equipment to automatically generate an equipment map of their equipment. The map may be produced at a level so granular that individual cables can be identified that are plugged into particular ports on the equipment, for example.

At step 204, AR processing unit 18 creates or retrieves an AR presentation from a CMS based on recognition of the equipment present and the target process being performed by the user.

In step 206, AR processing unit 18 tracks the location of the 3D object using one or more of sensors 22-30 as the user performs the target process. AR processing unit 18 recognizes, stores, and recalls where the 3D object was with respect to the user's real-world environment, and can use that location information in comparison to the AR presentation or past recordings of other user environments, as set forth in more detail below.

At step 208, the AR processing unit 18 senses user activity using one or more of sensors 22-30. AR processing unit 18 uses the sensed user activity in comparing the user activity to metadata associated with the AR presentation. AR processing unit 18 analyzes the user activity to determine which step of the target process the user is at and adjusts the AR presentation to portray content at the observed point in the target process.

In an embodiment, a social media data mark allows users to rank each step in the solution process. Users can record and upload a new versions of an individual step to the CMS. The VR experience feeds alternative solutions as an option. Users that elect to try a new version of a step may providing a rating for the new step. AR processing unit 18 monitors the ratings and maintains a ranking of the new step. If the ranking reaches a certain threshold, AR processing unit 18 may stitch the new step into the AR presentation of the target process.

In one embodiment, a user service request prompts AR processing unit 18 to capture environment data concerning the user's environment (i.e., their technology landscape). The data may be captured by a VR headset and fed to AR processing unit 18. In particular, a user service request prompts the system to analyze the environment for equipment present, determine environmental factors (e.g., special requirements based on space, length requirements of cables need to be ran, etc.). The data gathered provides additional data points for customer support providers to analyze the service request, and the environment the consuming users is in to determine an estimated length requirement for a technician to complete a job attempted by the user. In simple cases, the user effort can greatly trim the time a technician spends at the customer premise as users adopt this AR solution. Service providers gain the benefit of such analysis to generate an informed service request and can better estimate the length of time required to complete the target process by a technician. Consequently, more accurate technician dispatches may be achieved. However, service providers may also realize less calls for support, as users can search for what previously may have been a tough technical and hands on fix which they now can be visually walked through.

At step 210, AR processing unit 18 may change the output via display 16 and speaker 14 by enhancing or altering the display of an object in the AR presentation based on the comparing. Such enhancement may include, but is not limited to highlighting objects in the AR presentation, providing arrows or other indicators showing the user what to do, providing text or audio instructing the users what to do, etc. In addition, automated testing of the user's equipment may be tied into the equipment map, as the user performs the process. Changes in functional equipment state may be detected, as well as physical location of the equipment and other 3D objects. The AR presentation may be updated to indicate successful completion of steps in the process. AR processing unit 18 can generate a custom VR navigation experience unique for each user's environment by determining where they are in relation to their equipment map, along with a feed of their context to steer the user to the error piece of equipment in their home. Cable and internet ready homes can be completely set up by shipping the customer the tools and equipment, along with a link to the video walkthrough of how to set the system up, with the most novice user being simply visually walked through the process.

In one embodiment, the target process is in the medical field. AR content can improve emergency services and offer assistance or walkthroughs to treat patients.

In one embodiment, companies can incentivize customers to complete installations at their own premises, issue fixes, root cause discovery, etc. potentially based on an hourly based support system. In other words, the company can save support staff member time that would have been spent at a premises and would provide financial remuneration to compensate the customer.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
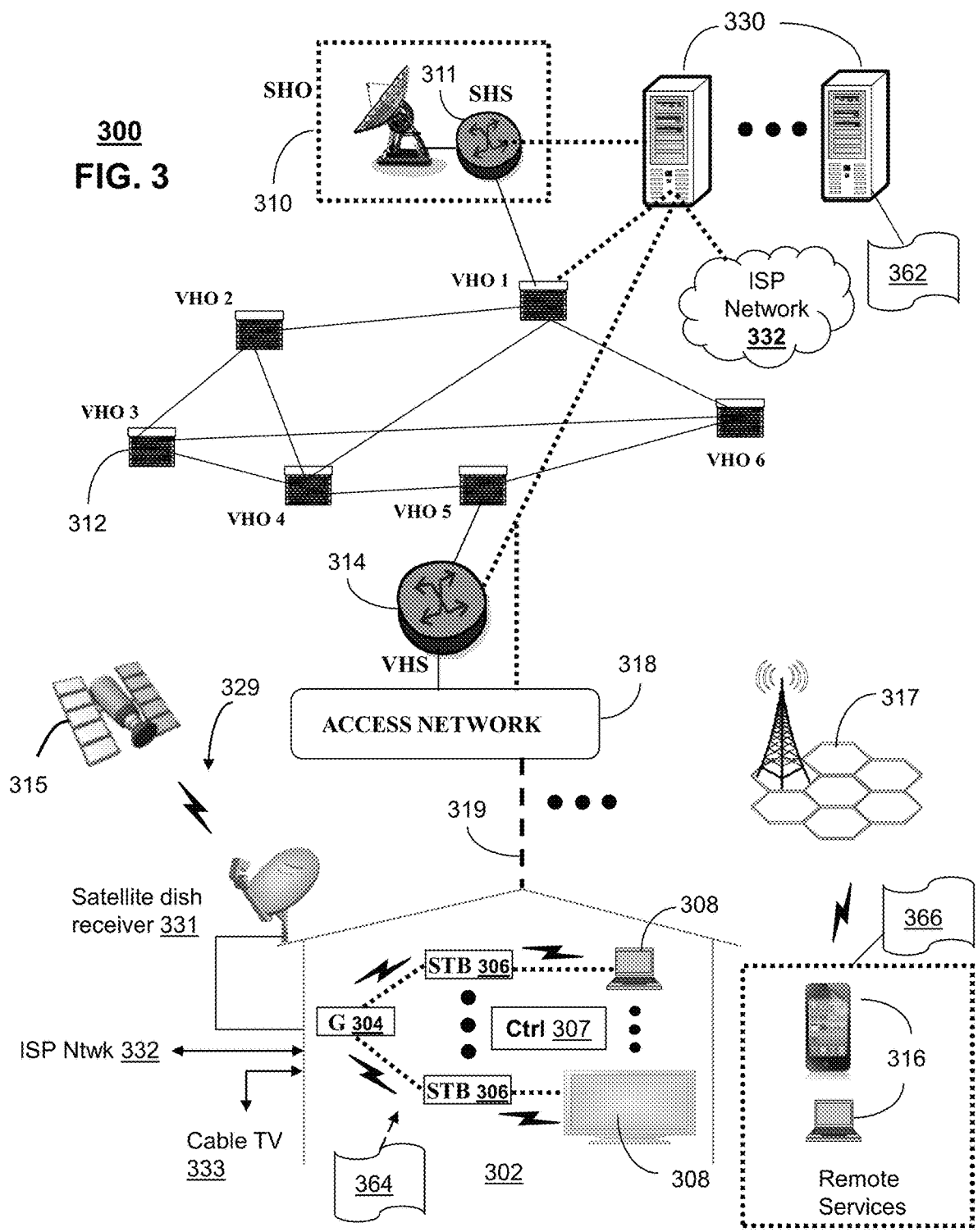
FIGS. 3-4 depict illustrative embodiments of communication systems that provide media services to a system for providing an augmented reality presentation.

FIG. 3 depicts an illustrative embodiment of a communication system 300 for providing various communication services, such as delivering media content. The communication system 300 can represent an interactive media network, such as an interactive television system (e.g., an Internet Protocol Television (IPTV) media system). Communication system 300 can be overlaid or operably coupled with system 100 as another representative embodiment of communication system 300. For instance, one or more devices illustrated in the communication system 300 of FIG. 3 can provide AR presentations like a device, comprising: a display; a sensor for detecting three dimensional objects; a processing system including a processor coupled to the display and sensors; and a memory that stores executable instructions that, when executed by the processing system, facilitate performance of operations, the operations comprising: identifying a three dimensional object proximal to a user of the device; tracking and storing a position of the three dimensional object; creating an augmented reality (AR) presentation for the user, wherein the AR presentation includes an image of the three dimensional object and an enhancement of the three dimensional object; and displaying the AR presentation to the user.

In one or more embodiments, the communication system 300 can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol. The VHS 314 can distribute multimedia broadcast content via an access network 318 to commercial and/or residential buildings 302 housing a gateway 304 (such as a residential or commercial gateway).

The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (Wi-Fi), Bluetooth®, ZigBee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 408 or wireless communication devices 316.

Communication system 300 can also provide for all or a portion of the computing devices 330 to function as a content management system (herein referred to as CMS 330). The CMS 330 can use computing and communication technology to perform function 362, which can include among other things, AR presentation techniques described by method 200 of FIG. 2. For instance, function 362 of server 330 can be similar to the functions described for AR processing unit 18 of FIG. 1 in accordance with method 200 of FIG. 2. The media processors 306 and wireless communication devices 316 can be provisioned with software functions 364 and 366, respectively, to utilize the services of CMS 330. For instance, functions 364 and 366 of media processors 306 and wireless communication devices 316 can be similar to the functions described for the system 100 of FIG. 1 in accordance with method 200 of FIG. 2.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
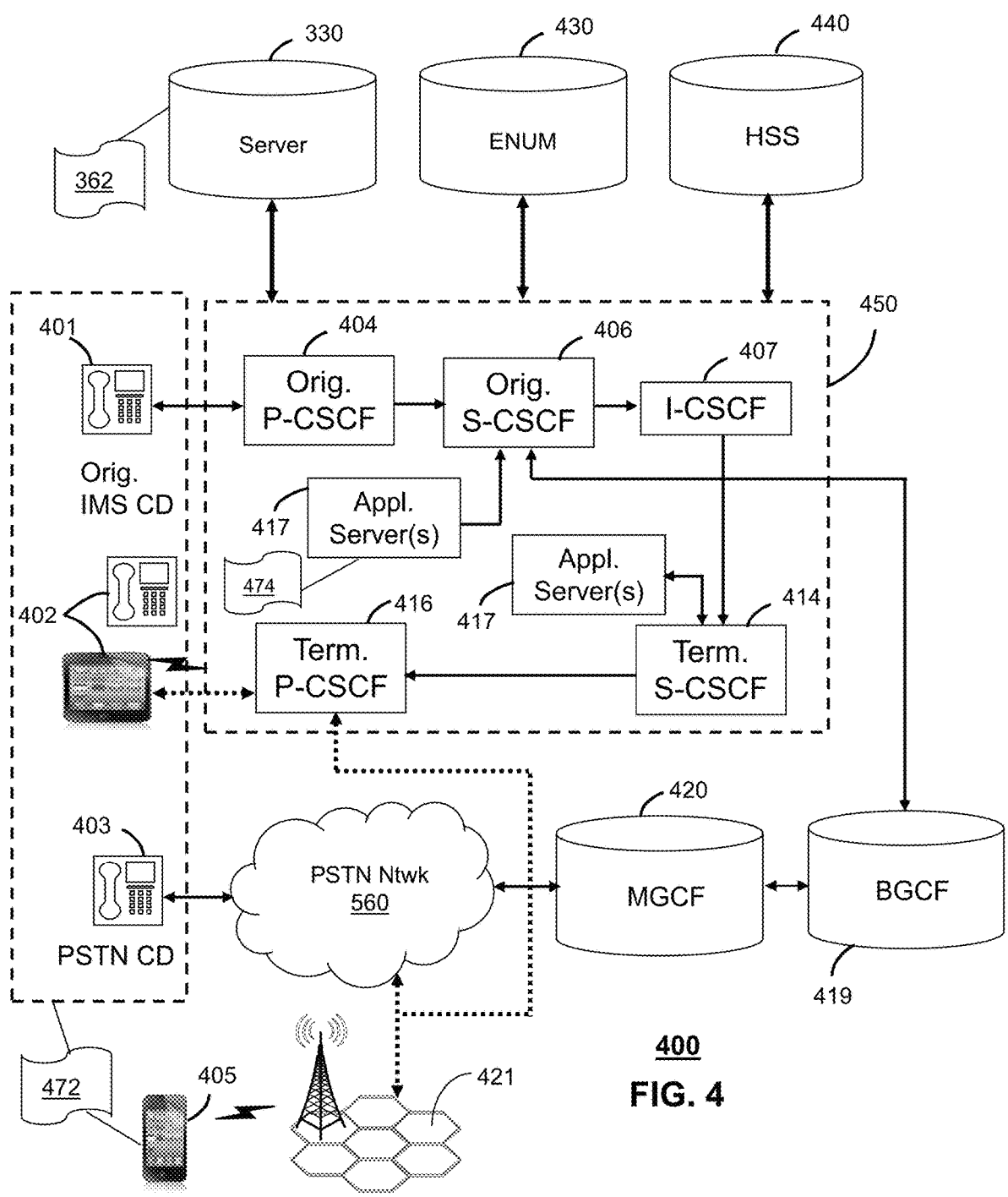

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 300 as another representative embodiment of communication system 300. Communication system 400 can comprise a processing system including a processor coupled to the display and sensors; and a memory that stores executable instructions that, when executed by the processing system, facilitate performance of operations, the operations comprising: identifying a three dimensional object proximal to a user of the device; tracking and storing a position of the three dimensional object; creating an augmented reality (AR) presentation for the user, wherein the AR presentation includes an image of the three dimensional object and an enhancement of the three dimensional object; and displaying the AR presentation to the user.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 520.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances, the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a Wi-Fi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The CMS 330 of FIG. 3 can be operably coupled to communication system 400 for purposes similar to those described above. CMS 330 can perform function 362 and thereby provide 200 services to the CDs 401, 402, 403 and 405 of FIG. 4 similar to the functions described for system 100 of FIG. 1 in accordance with method 200 of FIG. 2. CDs 401, 402, 403 and 405, which can be adapted with software to perform function 472 to utilize the services of the CMS 330 similar to the functions described for AR processing unit 18 of FIG. 1 in accordance with method 200 of FIG. 2. CMS 330 can be an integral part of the application server(s) 517 performing function 474, which can be substantially similar to function 362 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
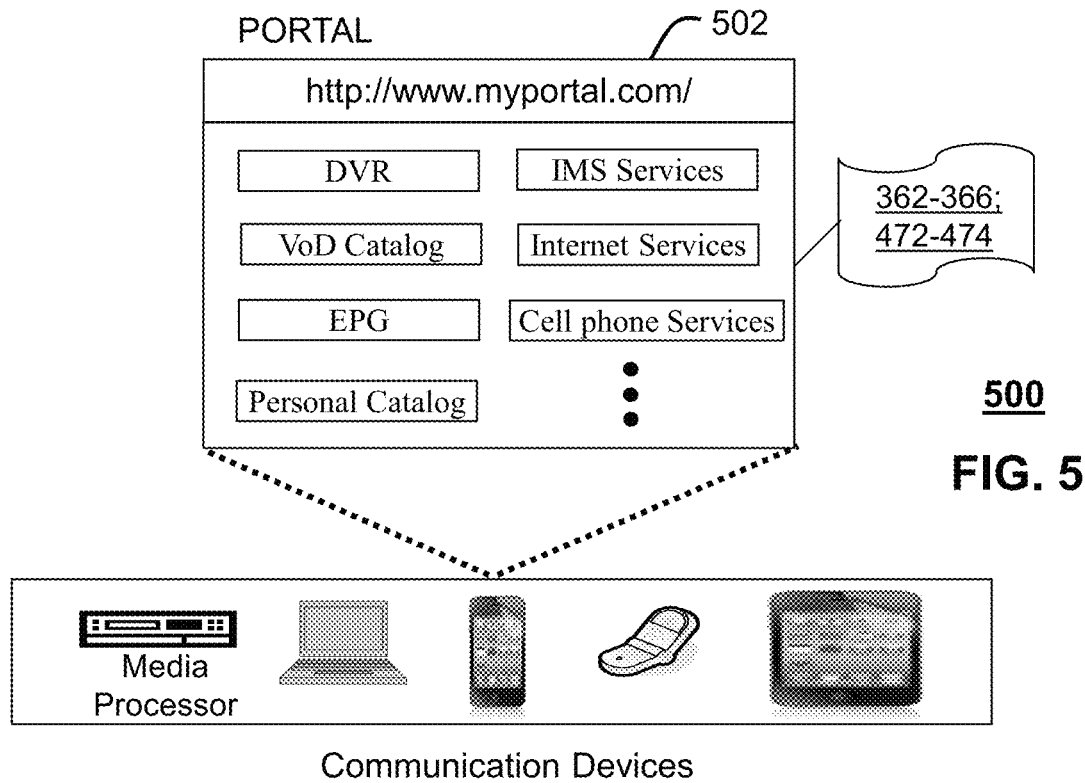
FIG. 5 depicts an illustrative embodiment of a web portal for interacting with the communication systems of FIG. 1 and FIGS. 3-4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of system 100 of FIG. 1 and communication systems 300-400. A web page of the web portal 502 can be accessed by a Uniform Resource Locator (URL) with an Internet browser using an Internet-capable communication device such as those described in FIG. 1 and FIGS. 3-4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300-400. For instance, users of the services provided by system 100 or CMS 330 can log into their on-line accounts and provision the servers 110 or server 430 with user profiles, equipment information, etc., as described in FIGS. 1-4, and so on. Service providers can log onto an administrator account to provision, monitor and/or maintain the system 100 of FIG. 1 or server 330.

Figure 6:
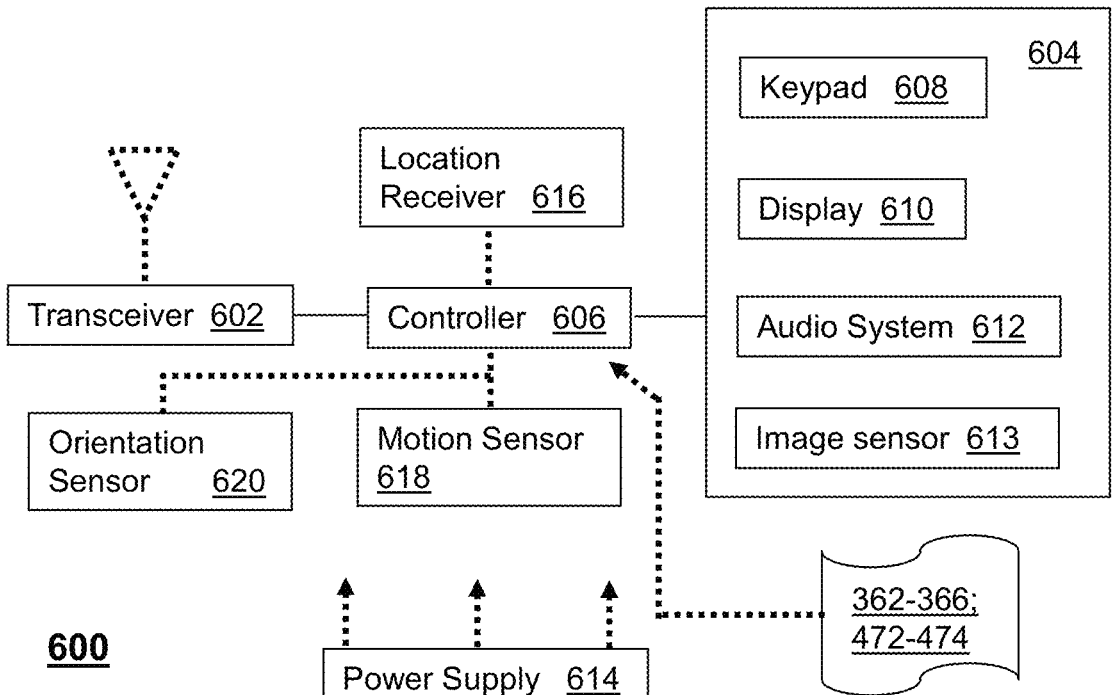
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1, and FIGS. 3-4-5 and can be configured to perform portions of method 200 of FIG. 2.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, the media processor 306, the media devices 308, or the portable communication devices 316 of FIG. 3, as well as the IMS CDs 401-402 and PSTN CDs 403-405 of FIG. 4. It will be appreciated that the communication device 600 can also represent other devices that can operate in system 100 of FIG. 1, communication systems 300-400 of FIGS. 3-4 such as a gaming console and a media player. In addition, the controller 606 can be adapted in various embodiments to perform the functions 362-366 and 472-474, respectively.

Upon reviewing the aforementioned embodiments, it would be evident to an artisan with ordinary skill in the art that said embodiments can be modified, reduced, or enhanced without departing from the scope of the claims described below. For example, the system may be adapted to including object 17 for only certain users 10, or for certain users that have an exact match for an item type 11. Specifically, a user must have model 2, version 1 of object 17 to access a certain instance of object 17. If the user has model 2, version 3, the user may not be provided the certain instance of object 17. In another embodiment, the augmented reality processing unit 18 may connect multiple users 10 to the same piece information 20 simultaneously. This simultaneous experience could display one or more objects 11 in display 16 depending on system configurations. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
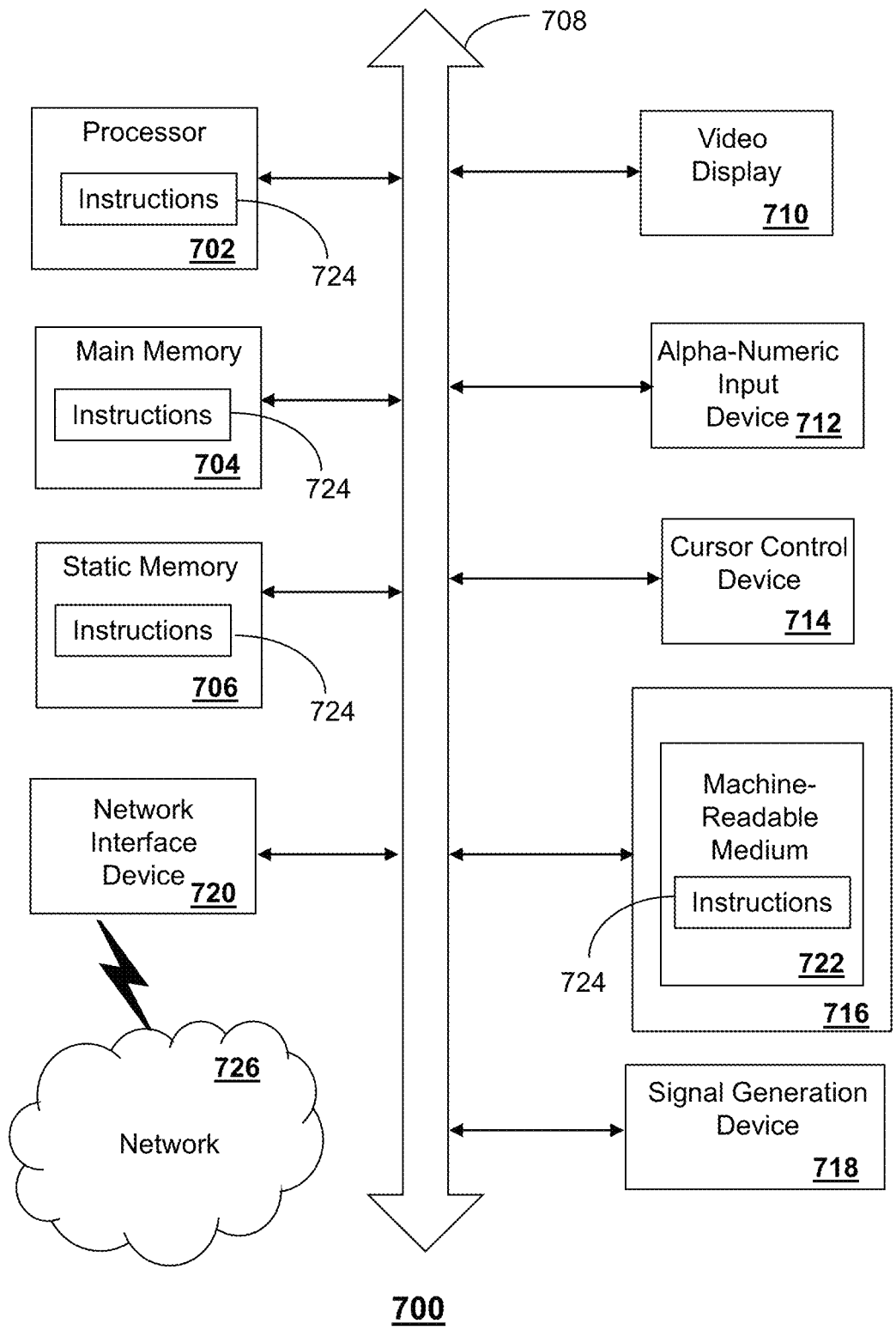
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 800 within which a set of instructions, when executed, may cause the machine to perform any one or more of the methods described above. One or more instances of the machine can operate, for example, as the CMS 330, the media processor 306, AR processing unit 18 and other devices of system 100 in FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid-state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:
   a display;
   a sensor for detecting three dimensional objects;
   a processing system including a processor coupled to the display and sensor; and
   a memory that stores executable instructions that, when executed by the processing system, facilitate performance of operations, the operations comprising:
   displaying an augmented reality (AR) presentation including an image of a three-dimensional object proximal to a user of the device;
   tracking a location of a three-dimensional object using one or more sensors;
   comparing user activity associated with the three-dimensional object to metadata in the AR presentation describing a process that is being performed by the user; and
   responsive to the comparing, supplementing the AR presentation with an enhancement to a visual image of the three-dimensional object, wherein the enhancement is rendered in real time, wherein the enhancement comprises highlighting the three-dimensional object, and wherein the enhancement comprises providing audio instructions or text describing subsequent actions by the user to continue performing the process.

2. The device of claim 1, wherein the processing system comprises a plurality of processors operating in a distributed processing environment, and wherein the sensor comprises a camera.

3. The device of claim 1, wherein the sensor comprises a motion sensor.

4. The device of claim 1, wherein the display comprises a speaker.

5. The device of claim 1, wherein the enhancement comprises audio information.

6. The device of claim 1, further comprising input devices.

7. The device of claim 6, wherein the input devices comprise a tablet, a keyboard, a mouse, a touch screen, a virtual reality glove, or a combination thereof.

8. The device of claim 1, wherein the display comprises a virtual reality (VR) headset.

9. The device of claim 8, wherein the VR headset comprises the sensor and a speaker.

10. The device of claim 1, wherein the sensor comprises a microphone.

11. A non-transitory, machine-readable storage medium, comprising executable instructions that, when executed by a processing system including a processor, facilitate performance of operations, the operations comprising:
displaying an augmented reality (AR) presentation from a content management system based on recognition of a three-dimensional (3D) object, wherein the AR presentation includes an image of the 3D object;
tracking a location of the 3D object using one or more sensors;
comparing user activity associated with the 3D object to metadata in the AR presentation describing a target process that is being performed by a user; and
responsive to the comparing, supplementing the AR presentation with an enhancement to a visual image of the 3D object, wherein the enhancement is rendered in real time, wherein the enhancement comprises highlighting the 3D object, and wherein the enhancement comprises providing audio instructions or text describing subsequent actions by the user to continue performing the target process.

12. The non-transitory, machine-readable storage medium of claim 11, wherein the processing system comprises a plurality of processors operating in a distributed processing environment.

13. The non-transitory, machine-readable storage medium of claim 11, wherein the enhancement comprises providing indicators showing subsequent actions by the user to continue performing the target process.

14. The non-transitory, machine-readable storage medium of claim 11, wherein the operations further comprise testing equipment of the user while the user performs the target process.

15. The non-transitory, machine-readable storage medium of claim 11, wherein the enhancement further comprises repositioning the location of the 3D object.

16. A method, comprising:
displaying, by a processing system including a processor, an augmented reality (AR) presentation from a content management system based on recognition of a target process being performed by a user, wherein the AR presentation includes an image of a three-dimensional (3D) object near the user;
tracking, by the processing system, a location of the 3D object using one or more sensors as the user performs the target process;
comparing, by the processing system, user activity associated with the 3D object to metadata in the AR presentation describing the target process that is being performed by the user; and
responsive to the comparing, supplementing, by the processing system, the AR presentation with an enhancement to a visual image of the 3D object, wherein the enhancement is rendered in real time, wherein the enhancement comprises highlighting the 3D object, and wherein the enhancement also provides audio instructions or text describing subsequent actions by the user to continue performing the target process.

17. The method of claim 16, wherein the enhancement further comprises repositioning the location of the 3D object.

18. The method of claim 16, further comprising recognizing a tag attached to the 3D object.

19. The method of claim 16, wherein the enhancement comprises providing indicators showing subsequent actions by the user to continue performing the target process.

20. The method of claim 16, further comprising testing equipment of the user while the user performs the target process.

* * * * *